(12) United States Patent
Abe

(10) Patent No.: US 12,044,919 B2
(45) Date of Patent: Jul. 23, 2024

(54) LIGHT CONTROL DEVICE AND LIGHT CONTROL SHEET FOR CHANGING HAZE AND CLARITY

(71) Applicant: TOPPAN Inc., Tokyo (JP)

(72) Inventor: Souhei Abe, Taito-ku (JP)

(73) Assignee: TOPPAN Inc., Tokyo (JP)

( * ) Notice: Subject to any disclaimer, the term of this patent is extended or adjusted under 35 U.S.C. 154(b) by 0 days.

(21) Appl. No.: 17/729,680

(22) Filed: Apr. 26, 2022

(65) Prior Publication Data

US 2022/0252929 A1   Aug. 11, 2022

Related U.S. Application Data

(63) Continuation of application No. PCT/JP2020/040823, filed on Oct. 30, 2020.

(30) Foreign Application Priority Data

Nov. 1, 2019   (JP) ................. 2019-200183

(51) Int. Cl.
*G02F 1/1335* (2006.01)
*G02F 1/1334* (2006.01)
(Continued)

(52) U.S. Cl.
CPC ...... *G02F 1/133504* (2013.01); *G02F 1/1334* (2013.01); *G02F 1/134309* (2013.01); *G02F 1/13452* (2013.01); *G02F 1/13454* (2013.01)

(58) Field of Classification Search
CPC .......................... G02F 1/133504; G02F 1/1334
See application file for complete search history.

(56) References Cited

U.S. PATENT DOCUMENTS

2021/0072572 A1   3/2021   Yamada et al.

FOREIGN PATENT DOCUMENTS

| JP | 2014-80605 | * | 5/2014 | ............ C09K 19/38 |
| JP | 2018-031870 A | | 3/2018 | |
| JP | 6493598 B1 | | 4/2019 | |

OTHER PUBLICATIONS

Extended European Search Report issued Nov. 8, 2022 in European Patent Application No. 20882373.2, citing document 24 therein, 9 pages.

(Continued)

*Primary Examiner* — Lauren Nguyen
(74) *Attorney, Agent, or Firm* — Oblon, McClelland, Maier & Neustadt, L.L.P.

(57) ABSTRACT

A light control sheet includes a first characteristic and a second characteristic selectively exhibited. In the first characteristic, an absolute value of a change in clarity per unit voltage is greater than an absolute value of a change in haze per unit voltage. In the second characteristic, an absolute value of a change in haze per unit voltage is equal to or greater than an absolute value of a change in clarity per unit voltage. Haze is calculated in accordance with JIS K 7136: 2000. Clarity is calculated by $100\times(L_C-L_R)/(L_C+L_R)$. $L_C$ is an intensity of straight light travelling straight along a travelling direction of parallel light that has entered the light control sheet, and $L_R$ is an intensity of narrow-angle scattered light having an angle within ±2.5° relative to the travelling direction of the parallel light.

20 Claims, 3 Drawing Sheets

(51) Int. Cl.
    *G02F 1/1343*     (2006.01)
    *G02F 1/1345*     (2006.01)

(56)     References Cited

OTHER PUBLICATIONS

Yeongyu Choi, et al., "Formation of polymer structure by thermally-induced phase separation in a dye-doped liquid crystal cell," Proceedings of SPIE, vol. 10941, XP060119145, 2019, 6 pages.
International Search Report issued Jan. 19, 2021 in PCT/JP2020/040823 filed Oct. 30, 2020, citing document AP therein, 5 pages (with English Translation).

\* cited by examiner

LIGHT CONTROL DEVICE AND LIGHT CONTROL SHEET FOR CHANGING HAZE AND CLARITY

CROSS-REFERENCE TO RELATED APPLICATIONS

The present application is a continuation of International Application No. PCT/JP2020/040823, filed Oct. 30, 2020, which is based upon and claims the benefits of priority to Japanese Application No. 2019-200183, filed Nov. 1, 2019. The entire contents of all of the above applications are incorporated herein by reference.

BACKGROUND OF THE INVENTION

Field of the Invention

The present invention relates to a light control device and a light control sheet.

Discussion of the Background

A light control device includes a light control sheet and a drive circuit. The light control sheet includes a light control layer and a pair of transparent electrodes sandwiching the light control layer therebetween in the thickness direction of the light control layer. The light control layer contains, for example, a polymer network which contains a plurality of domains, and a liquid crystal composition which contains liquid crystal molecules and is filled in the polymer network. The drive circuit applies voltage between the pair of transparent electrodes. In the light control sheet, the transmittance of the light control layer changes as the orientation state of the liquid crystal molecules changes corresponding to a potential difference between the pair of transparent electrode layers. The transmittance of the light control sheet is evaluated using haze, which is a ratio of diffuse transmittance to total light transmittance (for example, see JP 2018-31870 A).

SUMMARY OF THE INVENTION

According to an aspect of the present invention, a light control device includes a light control sheet, and a drive circuit that applies a drive voltage to the light control sheet. The light control sheet includes a first characteristic and a second characteristic which are selectively exhibited. In the first characteristic, an absolute value of a change in clarity per unit voltage is greater than an absolute value of a change in haze per the unit voltage. In the second characteristic, the absolute value of the change in the haze per the unit voltage is equal to or greater than the absolute value of the change in the clarity per the unit voltage. The haze is calculated in accordance with JIS K 7136:2000. The clarity is calculated by Formula (1):

$$100 \times (L_C - L_R)/(L_C + L_R) \qquad (1)$$

where $L_C$ is an intensity of straight light travelling straight along a travelling direction of parallel light that has entered the light control sheet, among light that has passed through the light control sheet, and $L_R$ is an intensity of narrow-angle scattered light having an angle within ±2.5° relative to the travelling direction of the parallel light.

According to another aspect of the present invention, a light control sheet includes a first characteristic and a second characteristic which are selectively exhibited. In the first characteristic, an absolute value of a change in clarity per unit voltage is greater than an absolute value of a change in haze per the unit voltage. In the second characteristic, the absolute value of the change in the haze per the unit voltage is equal to or greater than the absolute value of the change in the clarity per the unit voltage. The haze is calculated in accordance with JIS K 7136:2000, and the clarity is calculated by Formula (1):

$$100 \times (L_C - L_R)/(L_C + L_R) \qquad (1)$$

where $L_C$ is an intensity of straight light travelling straight along a travelling direction of parallel light that has entered the light control sheet, among light that has passed through the light control sheet, and $L_R$ is an intensity of narrow-angle scattered light having an angle within ±2.5° relative to the travelling direction of the parallel light.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
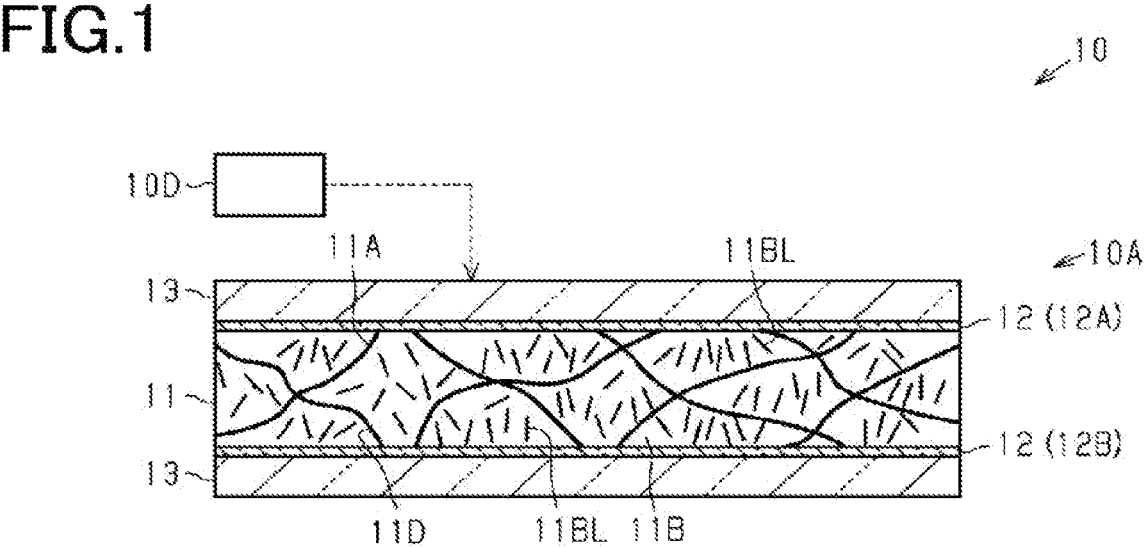
FIG. 1 is a cross-sectional view illustrating a state in which no drive voltage is applied to a light control layer according to a first configuration of a light control device.

The embodiments will now be described with reference to the accompanying drawings, wherein like reference numerals designate corresponding or identical elements throughout the various drawings.

An embodiment of the light control device and the light control sheet will be described with reference to FIGS. 1 to 6. In the following description, a configuration of the light control device, a calculation method for clarity, and examples will be sequentially described. In the present embodiment, an object that is present behind the light control sheet, e.g., an object whose secrecy is desired to be kept by the light control sheet, is collectively referred to as a concealment target. Examples of the concealment target may include a person, a device, and a stationary object.

<Light Control Device>

Referring to FIGS. 1 to 4, the light control device will be described.

The light control device according to the present embodiment includes a first configuration and a second configuration as described below.

<First Configuration>

Figure 2:
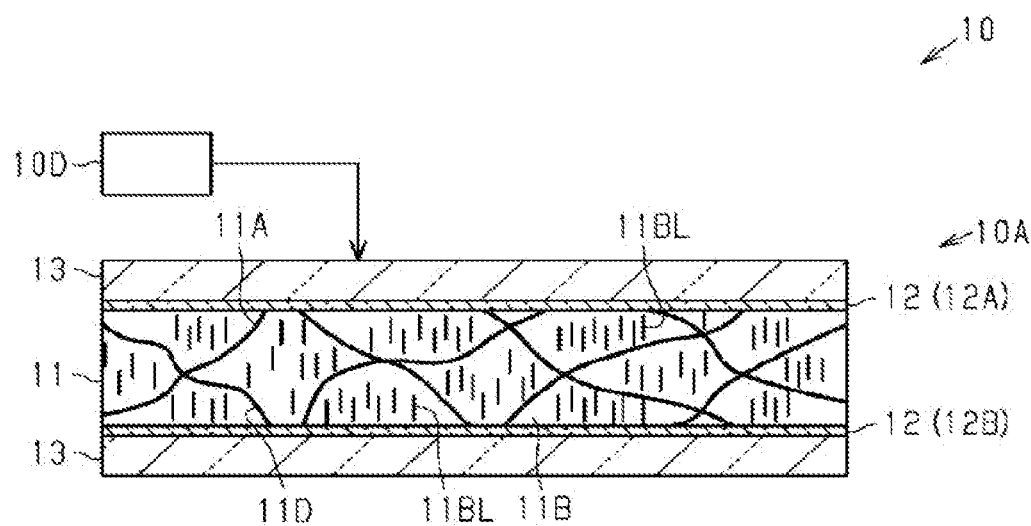
FIG. 2 is a cross-sectional view illustrating a state in which a drive voltage is applied to the light control layer according to the first configuration of the light control device.

Referring to FIGS. 1 and 2, the first configuration of the light control device will be described.

FIG. 1 shows a state in which no drive voltage is applied to the light control sheet in the first configuration of the light control device. The drive voltage is a voltage for changing the orientation of liquid crystal molecules provided in a light control layer included in a light control sheet. On the other hand, FIG. 2 shows a state in which in the first configuration of the light control device, a saturation voltage, which is a voltage that is unlikely to cause the orientation of the liquid crystal molecules to change with an increase in drive voltage, is applied. In the first configuration, as a drive voltage applied to the light control sheet increases, the orientation of the liquid crystal molecules changes from the orientation shown in FIG. 1 toward the orientation shown in FIG. 2.

As shown in FIG. 1, a light control device 10 includes a light control sheet 10A. The light control sheet 10A includes a light control layer 11, a pair of transparent electrode layers 12, and a pair of transparent substrates 13. In the present embodiment, the light control layer 11 includes a polymer network 11A and a liquid crystal composition 11B. The polymer network 11A contains a plurality of domains 11D. The domains 11D are voids defined in the polymer network 11A. The domains 11D may be spaces isolated from each other by the polymer network 11A or may be spaces communicating with each other. The liquid crystal composition 11B contains liquid crystal molecules 11BL and is filled in the domains 11D. A change in the orientation of the liquid crystal molecules 11BL in the light control layer 11 changes the transmittance of the light control layer 11.

The pair of transparent electrode layers 12 are constituted by a first transparent electrode layer 12A and a second transparent electrode layer 12B. The light control layer 11 is positioned between the first transparent electrode layer 12A and the second transparent layer 12B, and the pair of transparent electrode layers 12 sandwich the light control layer 11 in the thickness direction of the light control layer 11. The transparent electrode layers 12 are transparent to light in the visible light range. Materials for forming the transparent electrode layers 12 may include, for example, transparent conductive oxides (TCO) and conductive polymers. The pair of transparent substrates 13 sandwich the pair of transparent electrode layers 12 in the thickness direction of the light control layer 11. The transparent substrates 13 are transparent to light in the visible light range. Materials for forming the transparent substrates 13 may include, for example, glass and synthetic resins.

The light control device 10 further includes a drive circuit 10D to be connected with the light control sheet 10A. The drive circuit 10D applies a drive voltage between the first transparent electrode layer 12A and the second transparent electrode layer 12B. A change in the magnitude of a drive voltage applied to the transparent electrode layer 12 changes the orientation of the liquid crystal molecules in the light control layer 11, and thus changes a value of haze and a value of clarity in the light control sheet 10A.

The light control sheet 10A includes a first characteristic and a second characteristic. The first characteristic and the second characteristic are selectively exhibited corresponding to the orientation of the liquid crystal molecules 11BL in the light control layer 11. In the first characteristic, an absolute value of a change in a value of clarity per unit voltage is greater than an absolute value of a change in a value of haze per unit voltage. In the second characteristic, an absolute value of a change in a value of haze per unit voltage is equal to or greater than an absolute value of a change in a value of clarity per unit voltage. The haze is a parameter in accordance with JIS K 7136:2000. On the other hand, the clarity is a parameter defined by the later-described Formula (1).

A change $\Delta H$ in haze when a drive voltage applied to the light control sheet 10A is changed from drive voltage $V_1$ to drive voltage $V_2$ is calculated from the following Formula (2). It should be noted that $H_1$ is a value of haze when drive voltage $V_1$ is applied, and $H_2$ is a value of haze when drive voltage $V_2$ is applied. Also, drive voltage $V_2$ is greater than drive voltage $V_1$, and a value obtained by subtracting drive voltage $V_1$ from drive voltage $V_2$ is a unit voltage ($V_2-V_1$), that is, a voltage change $\Delta V$ in applied voltage.

$$\Delta H = (H_2 - H_1)/(V_2 - V_1) \qquad \text{Formula (2)}$$

Also, a change $\Delta C$ in clarity when a drive voltage applied to the light control sheet 10A is changed from drive voltage $V_1$ to drive voltage $V_2$ is calculated from the following Formula (3). It is noted that $C_1$ is a value of clarity when drive voltage $V_1$ is applied, and $C_2$ is a value of clarity when drive voltage $V_2$ is applied. Also, drive voltage $V_2$ is greater than drive voltage $V_1$.

$$\Delta C = (C_2 - C_1)/(V_2 - V_1) \qquad \text{Formula (3)}$$

$|\Delta H|$ is the absolute value of the change in haze per unit voltage calculated from Formula (2), and $|\Delta C|$ is the absolute value of the change in clarity per unit voltage calculated from Formula (3). The above-described first characteristic is defined by the following Formula (4), and the second characteristic is defined by the following Formula (5).

$$|\Delta H| < |\Delta C| \qquad \text{Formula (4)}$$

$$|\Delta H| \geq |\Delta C| \qquad \text{Formula (5)}$$

The drive circuit 10D applies a drive voltage corresponding to a predetermined value in clarity between the transparent electrode layers 12 to cause the light control sheet 10A to exhibit the first characteristic. Also, the drive circuit 10D applies a drive voltage corresponding to a predetermined value in haze between the transparent electrode layers 12 to cause the light control sheet 10A to exhibit the second characteristic. In this manner, when the first characteristic is exhibited in the light control sheet 10A, a predetermined value of clarity, which controls the sense of turbidity, i.e., the degree of scattering to serve as an index for the degree of turbidity, is obtained. Also, when the second characteristic is exhibited in the light control sheet 10A, a predetermined value of haze, which controls the sense of transparency, i.e., the degree of scattering to serve as an index for the degree of transparency, is obtained. This enhances the effectiveness of obtaining the effect of suppressing discrepancies in recognition of an object through the light control sheet.

The unit voltage ($V_2-V_1$) is preferably 5 V or less. Compared to when the unit voltage ($V_2-V_1$) is more than 5 V, superiority in clarity in the first characteristic and superiority in haze in the second characteristic can be achieved even when the change in a voltage value applied to the light control sheet 10A is smaller. Therefore, compared to when the unit voltage ($V_2-V_1$) is more than 5 V, the degree of scattering can be more precisely controlled in the characteristics.

The drive circuit 10D can be switched between application of a first drive voltage and application of a second drive voltage. The drive circuit 10D is configured to be switchable between application of a first drive voltage and application of a second drive voltage. That is, the drive circuit 10D can switch a drive voltage from a first drive voltage to a second drive voltage, and also can switch from a second drive voltage to a first drive voltage. The drive circuit 10D can perform such switching of a drive voltage at an optional timing.

The first drive voltage is a voltage for the light control sheet 10A to exhibit the first characteristic and have a first state. The first state is a state in which a gradually changing value of haze converges to 98% or more and 100% or less, and a value of clarity is 80% or less. The first state contains a state in which the light control layer 10A has highest opacity. The second drive voltage is a voltage for the light control sheet 10A to exhibit the second characteristic and enter a second state. The second state is a state in which a value of clarity, which changes gradually, converges to 99% or more and 100% or less, and a value of haze is 15% or less. The second state includes a state in which the light control layer 10A has highest transparency.

That is, in response to the drive circuit 10D applying the first drive voltage to the light control sheet 10A, the light control sheet 10A exhibits the first characteristic to achieve a first state. The first state is a state in which a value of haze gradually changes and converges to 98% or more and 100% or less, and the light control 10A has a value of haze having converged and a value of clarity being 80% or less. In response to the drive circuit 10D applying the second drive voltage to the light control sheet 10A the light control sheet 10A exhibits the second characteristic and enter a second state. The second state is a state in which a value of clarity which changes gradually converges to 99% or more and 100% or less, and in which the light control sheet 10A has the converged value of clarity and a value of haze which is 15% or less.

As described above, in the light control device 10 shown in FIG. 1, no drive voltage is applied to the pair of transparent electrode layers 12. In this case, the liquid crystal molecules 11BL positioned in the respective domains 11D are randomly oriented. Therefore, the light that has entered the light control device 10 through either of the pair of transparent substrates 13 is isotropically scattered in the light control layer 11. Accordingly, compared to when a drive voltage is applied to the light control sheet 10A, the light control sheet 10A has a higher value of haze and a lower value of clarity. The light control sheet 10A shown in FIG. 1 is an example of the above-described first state.

As described above, in the light control sheet 10A shown in FIG. 2, the drive circuit 10D applies a saturation voltage to the pair of transparent electrode layers 12. Accordingly, the orientation of the liquid crystal molecules 11BL changes from a random orientation to, for example, a vertical orientation that is a direction allowing light to pass through the light control layer 11. In other words, the liquid crystal molecules 11BL are positioned in the domains 11D such that the long axes of the liquid crystal molecules 11BL are substantially perpendicular to the plane in which the light control layer 11 spreads. Therefore, the light that has entered the light control sheet 10A through either of the pair of transparent substrates 13 passes through the light control layer 11 without being substantially scattered in the light control layer 11. In this case, compared to when no drive voltage is applied to the light control sheet 10A, the light control sheet 10A has a lower value of haze and a higher value of clarity. The light control sheet 10A shown in FIG. 2 is an example of the above-described second state.

<Second Configuration>

Figure 3:
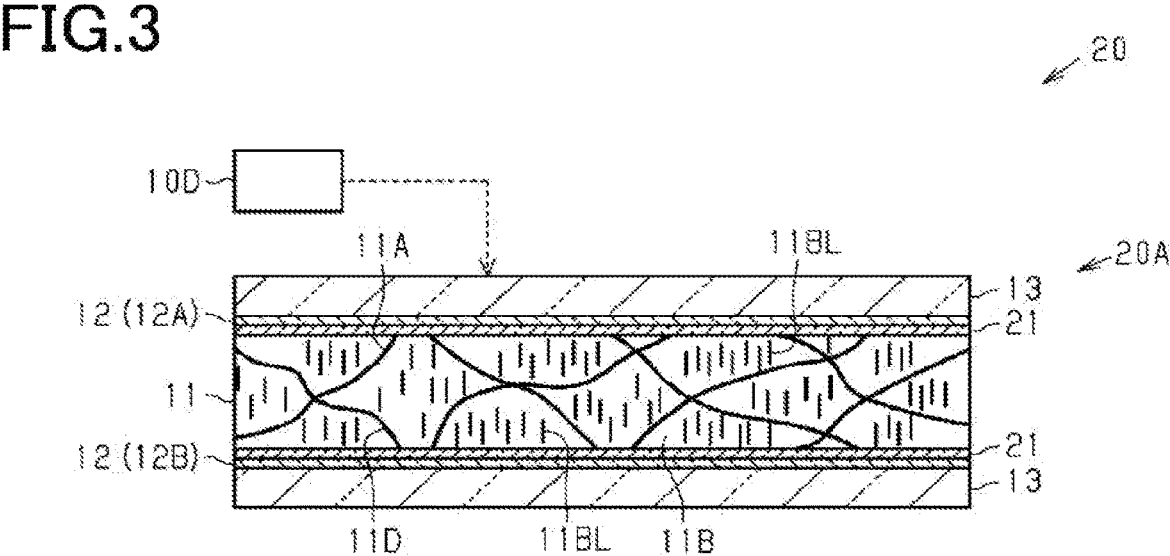
FIG. 3 is a cross-sectional view illustrating a state in which no drive voltage is applied to a light control layer according to a second configuration of a light control device.
Figure 4:
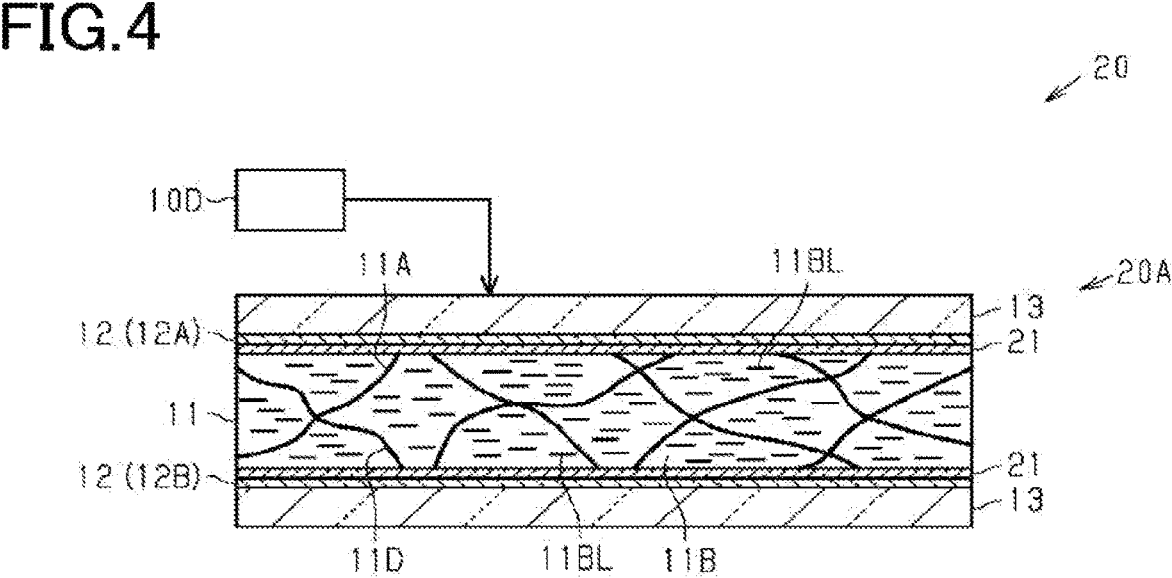
FIG. 4 is a cross-sectional view illustrating a state in which a drive voltage is applied to the light control layer according to the second configuration of the light control device.

Referring to FIGS. 3 and 4, the second configuration of the light control device will be described.

FIG. 3 shows a state in which no drive voltage is applied to the light control sheet in the second configuration of the light control device. On the other hand, FIG. 4 shows a state in which a saturation voltage as an example of a drive voltage is applied to the light control sheet in the second configuration of the light control device. In the second configuration, as the drive voltage applied to the light control sheet increases, the orientation of the liquid crystal molecules changes from the orientation shown in FIG. 3 toward the orientation shown in FIG. 4.

FIG. 3 shows a light control device 20 including a light control sheet 20A which includes, in addition to the light control layer 11, the pair of transparent electrodes 12, and the pair of transparent substrates 13, a pair of orientation layers 21. The pair of orientation layers 21 sandwich the light control layer 11 in the thickness direction of the light control layer 11, and are positioned closer to the center portion of the light control sheet 20A than are the pair of transparent electrode layers 12 in the thickness direction of the light control layer 11. In other words, one of the orientation layers 21 is positioned between the light control layer 11 and the first transparent electrode layer 12A, and the other is positioned between the light control layer 11 and the second transparent electrode layer 12B.

In the light control device 20, similarly to in the light control device 10, the light control sheet 20A selectively exhibits a first characteristic and a second characteristic. In the first characteristic, an absolute value of a change in a value of clarity per unit voltage is greater than an absolute value of a change in a value of haze per unit voltage. In the second characteristic, an absolute value of a change in a value of haze per unit voltage is equal to or greater than an absolute value of a change in a value of clarity per unit voltage. The unit voltage ($V_2-V_1$) is preferably 5 V or less.

Also, similarly to the drive circuit 10D of the light control device 10, the drive circuit 10D applies a drive voltage corresponding to a predetermined value in clarity between the transparent electrode layers 12 to cause the light control sheet 20A to exhibit the first characteristic. Also, the drive circuit 10D applies a drive voltage corresponding to a predetermined value in haze between the transparent electrode layers 12 to cause the light control sheet 20A to exhibit the second characteristic. The drive circuit 10D can be switched between application of a first drive voltage and application of a second drive voltage. The drive circuit 10D is configured to be switchable between application of a first drive voltage and application of a second drive voltage. That is, the drive circuit 10D can switch a drive voltage from a first drive voltage to a second drive voltage, and also can switch from a second drive voltage to a first drive voltage. The drive circuit 10D can perform such switching of a drive voltage at an optional timing.

The first drive voltage is a voltage for the light control sheet 20A to exhibit the first characteristic and have a first state. The first state is a state in which a gradually changing value of haze converges to 98% or more and 100% or less, and a value of clarity is 80% or less. The second drive voltage is a voltage for the light control sheet 20A to exhibit the second characteristic and enter a second state. The second state is a state in which a gradually changing value of clarity converges to 99% or more and 100% or less, and a value of haze is 15% or less.

That is, in response to the drive circuit 10D applying the first drive voltage to the light control sheet 20A, the light control sheet 20A exhibits the first characteristic to achieve a first state. The first state is a state in which a value of haze gradually changes and converges to 98% or more and 100% or less, and the light control sheet 20A has a value of haze having converged and a value of clarity being 80% or less. In response to the drive circuit 10D applying the second drive voltage to the light control sheet 20A, the light control sheet 20A exhibits the second characteristic to achieve a second state. The second is a state in which a value of clarity gradually changes and converges to 99% or more and 100% or less, and the light control sheet 20A has a value of haze having converged and a value of clarity being 15% or less.

When each of the orientation layers 21 is a vertical orientation layer, the orientation of the liquid crystal molecules 11BL provided in the domains 11D is a vertical orientation, in a state in which no drive voltage is applied to the light control sheet 20A. In other words, the liquid crystal molecules 11BL are positioned in the domains 11D such that the long axes of the liquid crystal molecules 11BL are substantially perpendicular to the plane in which the light control layer 11 spreads. Therefore, the light that has entered the light control sheet 20A through either of the pair of transparent substrates 13 passes through the light control layer 11 without being substantially scattered in the light control layer 11. Accordingly, compared to when no drive voltage is applied to the light control sheet 20A, the light control sheet 20A has a lower value of haze and a higher value of clarity. The light control sheet 20A shown in FIG. 3 is an example of the above-described second state.

As described above, in the light control sheet 20A shown in FIG. 4, a saturation voltage is applied to the pair of transparent electrode layers 12. This changes the orientation of the liquid crystal molecules 11BL. For example, the orientation of the liquid crystal molecules 11BL changes from a vertical orientation to a horizontal orientation. In this case, the liquid crystal molecules 11BL are positioned in the domains 11D such that the long axes of the liquid crystal molecules 11BL extend along the plane in which the light control layer 11 spreads. Therefore, the light that has entered the light control sheet 20A through either of the pair of transparent substrates 13 is scattered in the light control layer 11. In this case, compared to when no drive voltage is applied to the light control sheet 20A, the light control sheet 20A has a higher value of haze and a lower value of clarity. The light control sheet 20A shown in FIG. 4 is an example of the above-described first state.

<Method of Measuring Clarity>

Figure 5:
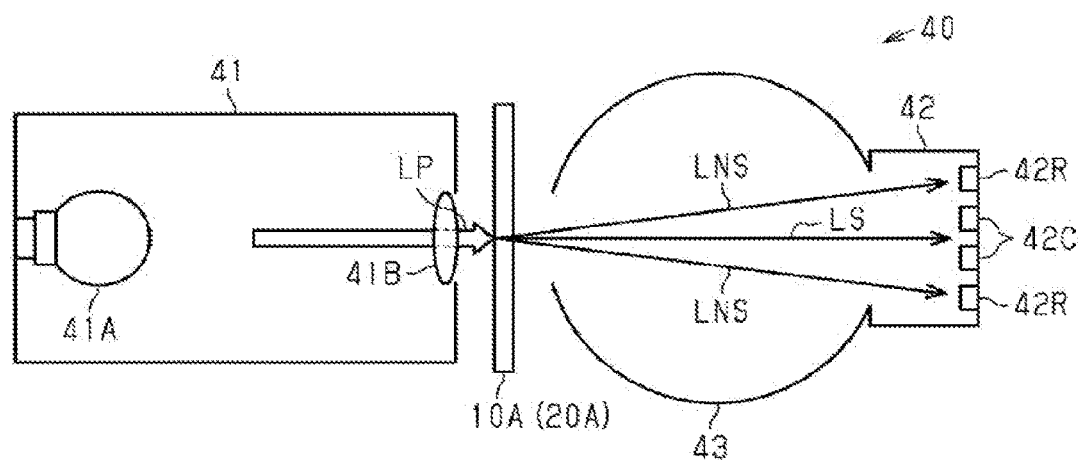
FIG. 5 is a device configuration diagram schematically illustrating a configuration of a measurement device for clarity, together with a light control device to be measured.

Referring to FIG. 5, a method of measuring clarity will be described. FIG. 5 schematically shows an example of a measurement device used for calculating clarity.

FIG. 5 shows a measurement device 40 used for measuring clarity, which includes an illumination part 41, a light-receiving part 42, and an integrating sphere 43. The illumination part 41 includes a light source 41A and a lens 41B. The light source 41A is a white LED, and the lens 41B converts the light emitted from the light source 41A into parallel light. The light-receiving part 42 includes a center sensor 42C and an outer peripheral sensor 42R. The center sensor 42C and the outer peripheral sensor 42R are annularly shaped. The outer peripheral sensor 42R is positioned outside the center sensor 42C. The measurement device 40 can be used for measuring not only clarity to be measured but also for measuring haze. The integrating sphere 43 of the measurement device 40 is used only for measuring haze.

In the measurement device 40, the light control sheet 10A or 20A is placed between the illumination part 41 and the integrating sphere 43. The flux of parallel light emitted from the lens 41B has a diameter of 14 mm in the present embodiment. The light that has passed through the light control sheet 10A or 20A includes straight light LS and narrow-angle scattered light LNS. The straight light LS travels straight along a travelling direction of parallel light LP that has entered the light control layer 11. The narrow-angle scattered light LNS has an angle within ±2.5° relative to the travelling direction of the parallel light LP. In the light-receiving part 42, the center sensor 42C receives the straight light LS, and the outer peripheral sensor 42R receives the narrow-angle scattered light LNS. The intensity of the straight light LS received by the center sensor 42C is defined to be $L_C$, and the intensity of the narrow-angle scattered light LNS received by the outer peripheral sensor 42R is defined to be $L_R$.

The clarity is calculated from the following Formula (1):

$$100 \times (L_C - L_R)/(L_C + L_R) \quad \text{Formula (1)}$$

where $L_C$ is the intensity of the straight light LS travelling straight along the travelling direction of the parallel light LP that has entered the light control sheet 11, among light that has passed through the light control sheet 11, and $L_R$ is the intensity of the narrow-angle scattered light LNS having an angle within ±2.5° relative to the travelling direction of the parallel light LP.

In this manner, clarity is a parameter for evaluating the state of the light control sheet 10A or 20A using the narrow-angle scattered light. Therefore, clarity can be used for evaluating the degree of sharpness of very small portions of a concealment target in an image of the concealment target through the light control sheet 10A or 20A. Thus, when an observer visually recognizes a concealment target through the light control sheet 10A or 20A, the contour of the concealment target through the light control sheet 10A or 20A, i.e., the sharpness of the concealment target, is lowered as the value of clarity in the light control sheet 10A or 20A decreases. In this manner, clarity is used for evaluating the sharpness of an image of a concealment target visually recognized through the light control sheet 10A or 20A.

<Method of Calculating Haze>

The haze of the light control sheet 10A or 20A can be calculated using the light intensity measured by the measurement device 40. As described above, the haze is calculated by a method in accordance with JIS K 7136:2000. When measuring haze by the measurement device 40, the light that has passed through the light control sheet 10A or 20A is received by the light-receiving part disposed in the integrating sphere 43.

Haze refers to a percentage of the light that has deviated by more than 2.5° from the incident light due to forward scattering in the light that has passed through the light control sheet 10A or 20A. In other words, in haze measurement, parallel light refers to light having an angle within ±2.5° relative to the optical axis of the parallel light LP, and wide-angle scattered light refers to light having an angle of more than ±2.5°. The transmittance of the wide-angle scattered light is defined to be a scattered transmittance $T_d$, the transmittance of the parallel light is defined to be a parallel light transmittance $T_p$, the sum of the parallel light transmittance $T_p$ and the scattered transmittance $T_d$ is defined to be a total light transmittance $T_t$. In this case, haze is the ratio of the scattered transmittance $T_d$ to the total light transmittance $T_t$.

In this manner, haze is a parameter for evaluating the state of the light control sheet 10A or 20A using the wide-angle scattered light. Therefore, haze can be used for evaluating the degree of turbidity of the entirety of the light control sheet 10A or 20A perceived by an observer, when the light control sheet 10A or 20A is visually observed. Thus, when an observer visually recognizes a concealment target through the light control sheet 10A or 20A, the contrast between the concealment target through the light control sheet 10A or 20A and the surrounding of the concealment target is lowered as the value of haze in the light control sheet 10A or 20A increases. Accordingly, the concealment target appears blurred to the observer.

Furthermore, in the light control sheet 10A or 20A, an absolute value of a change in one of the value of clarity and the value of haze is greater than an absolute value of a change in the other, in ranges different from each other in the entire range of a drive voltage applied to the light control sheet 10A or 20A. In the entire range of a drive voltage applied to the light control sheet 10A or 20A, a first range is such that an absolute value of a change in clarity per unit voltage is greater than an absolute value of a change in haze. Further, a second range, which is different from the first range, is such that an absolute value of a change in haze per unit voltage is greater than an absolute value of a change in clarity per unit voltage.

Furthermore, when a drive voltage in the first range is applied to the light control sheet 10A or 20A, the value of haze may be higher while the value of clarity may be lower, compared to when a drive voltage in the second range is applied to the light control sheet 10A or 20A. In other words, when a drive voltage in the first range is applied to the light control sheet 10A or 20A, the transmittance of the light control sheet 10A or 20A may be lower, compared to when a drive voltage in the second range is applied to the light control sheet 10A or 20A.

In other words, when a drive voltage in the second range is applied to the light control sheet 10A or 20A, the value of haze may be lower while the value of clarity may be higher, compared to when a drive voltage in the first range is applied to the light control sheet 10A or 20A. In other words, when a drive voltage in the second range is applied to the light control sheet 10A or 20A, the transmittance of the light control sheet 10A or 20A may be higher, compared to when a drive voltage in the first range is applied to the light control sheet 10A or 20A.

Therefore, for example, the light control sheet 10A or 20A can be produced such that, in a range in which the transmittance of the light control sheet 10A or 20A is relatively low, a value of clarity is used to manage the performance of the light control sheet 10A or 20A in order to suppress the variance in performance of the light control sheet 10A or 20A when the light control sheet 10A or 20A is in a specific drive state. On the other hand, in a range in which the transmittance of the light control sheet 10A or 20A is relatively high, a value of haze is used to manage the performance of the light control sheet 10A or 20A in order to suppress the variance in performance of the light control sheet 10A or 20A when the light control sheet 10A or 20A is in a specific drive state.

As a result, the occurrence of discrepancies between products in recognition of an object through the light control sheet 10A or 20A can be suppressed during the production stage of the light control sheet 10A or 20A.

Also, for example, the light control sheet 10A or 20A can be driven such that, in a range in which the transmittance of the light control sheet 10A or 20A is relatively low, a value of clarity is used to control the magnitude of a drive voltage applied to the light control sheet 10A or 20A in order to suppress the variance in performance of the light control sheet 10A or 20A when the light control sheet 10A or 20A is in a specific drive state. On the other hand, in a range in which the transmittance of the light control sheet 10A or 20A is relatively high, a value of haze is used to control the magnitude of a drive voltage applied to the light control sheet 10A or 20A in order to suppress the variance in performance of the light control sheet 10A or 20A when the light control sheet 10A or 20A is in a specific drive state.

As a result, the occurrence of discrepancies in recognition of an object through the light control sheet 10A or 20A can be suppressed when driving the light control sheet 10A or 20A which involves stepwise control of the light control sheet 10A or 20A.

Examples

Examples of the light control device will be described below.

A light control sheet having a polymer network type light control layer was prepared. The light control sheet was electrically connected with a drive circuit that outputs a drive voltage to the light control sheet, to thereby obtain a light control device. In the present example, the light control sheet provided in the light control device having the above-described first configuration was prepared. The value of haze and the value of clarity in the light control sheet were measured while changing the magnitude of a drive voltage applied to the light control sheet.

The value of haze in the light control sheet was measured using a haze meter (NDH7000SP manufactured by NIPPON DENSHOKU INDUSTRIES CO., LTD.) by a method in accordance with JIS K 7136:2000. Also, the value of clarity in the light control sheet was calculated using a haze and transparency measuring apparatus (haze-gard i manufactured by BYK-Gardner GmbH) by the above-described calculation method. From the calculated values of haze and clarity, a voltage change ΔV, an absolute value |ΔH| of a change in haze, and an absolute value |ΔC| of a change in clarity were calculated.

Figure 6:
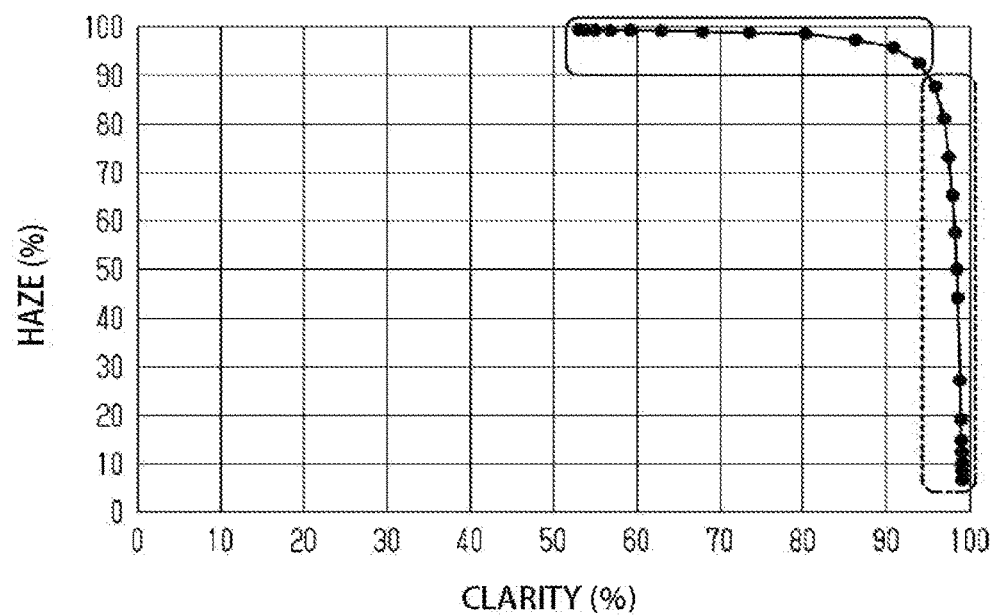
FIG. 6 is a graph illustrating a relationship between haze and clarity in a light control sheet.

FIG. 6 and Table 1 show the measurement results of haze and clarity. Table 1 also shows the calculation result of each value. In FIG. 6, the range surrounded by solid lines indicates the relationship between the value of haze and the value of clarity obtained when a drive voltage having any magnitude in a range of 0 V or more and 12 V or less is applied to the light control sheet. Also, in FIG. 6, the range surrounded by broken lines indicates the relationship between the value of haze and the value of clarity obtained when a drive voltage having any magnitude in a range of 13 V or more and 100 V or less is applied to the light control sheet.

TABLE 1

| VOLTAGE (V) | HAZE (%) | CLARITY (%) | ΔV (V) | |ΔH| (%) | |ΔC| (%) |
|---|---|---|---|---|---|
| 0 | 98.8 | 53.8 | — | — | — |
| 5 | 98.8 | 56.8 | 5 | 0.0 | 0.6 |
| 10 | 97.8 | 80.5 | 5 | 0.2 | 4.7 |
| 11 | 96.8 | 86.4 | 1 | 0.9 | 5.9 |
| 12 | 95.2 | 91.0 | 1 | 1.7 | 4.6 |
| 13 | 91.9 | 94.1 | 1 | 3.2 | 3.1 |
| 14 | 87.1 | 95.9 | 1 | 4.8 | 1.8 |
| 15 | 80.4 | 97.1 | 1 | 6.7 | 1.2 |
| 16 | 72.5 | 97.7 | 1 | 7.9 | 0.6 |
| 17 | 64.3 | 98.2 | 1 | 8.2 | 0.5 |
| 18 | 56.7 | 98.4 | 1 | 7.6 | 0.2 |
| 19 | 49.9 | 98.6 | 1 | 6.8 | 0.2 |
| 20 | 44.1 | 98.7 | 1 | 5.8 | 0.1 |
| 25 | 27.0 | 99.0 | 5 | 3.4 | 0.1 |
| 30 | 19.2 | 99.1 | 5 | 1.6 | 0.0 |
| 35 | 15.0 | 99.1 | 5 | 0.8 | 0.0 |
| 40 | 12.5 | 99.2 | 5 | 0.5 | 0.0 |

TABLE 1-continued

| VOLTAGE (V) | HAZE (%) | CLARITY (%) | ΔV (V) | \|ΔH\| (%) | \|ΔC\| (%) |
|---|---|---|---|---|---|
| 45 | 10.8 | 99.2 | 5 | 0.3 | 0.0 |
| 50 | 9.7 | 99.2 | 5 | 0.2 | 0.0 |
| 55 | 8.9 | 99.2 | 5 | 0.2 | 0.0 |
| 60 | 8.3 | 99.2 | 5 | 0.1 | 0.0 |
| 65 | 7.8 | 99.2 | 5 | 0.1 | 0.0 |
| 70 | 7.4 | 99.2 | 5 | 0.1 | 0.0 |
| 75 | 7.2 | 99.2 | 5 | 0.1 | 0.0 |
| 80 | 6.9 | 99.2 | 5 | 0.0 | 0.0 |
| 85 | 6.7 | 99.2 | 5 | 0.0 | 0.0 |
| 90 | 6.6 | 99.2 | 5 | 0.0 | 0.0 |
| 95 | 6.5 | 99.2 | 5 | 0.0 | 0.0 |
| 100 | 6.4 | 99.3 | 5 | 0.0 | 0.0 |

As can be seen from FIG. 6, when a drive voltage applied to the light control sheet is in a range of 0 V or more and 12 V or less, the value of clarity changes steeply with a change in the magnitude of a drive voltage, but the value of haze does not substantially change with a change in the magnitude of a drive voltage.

On the other hand, it was found that when a drive voltage applied to the light control sheet is in a range of 13 V or more and 100 V or less, the value of haze changes steeply with a change in the magnitude of a drive voltage, but the value of clarity does not substantially change with a change in the magnitude of a drive voltage.

Also, as can be seen from Table 1, when a drive voltage applied to the light control sheet is in a range of 0 V or more and 12 V or less, the absolute value |ΔC| of a change in the value of clarity is greater than the absolute value |ΔH| of a change in the value of haze. On the other hand, it was found that when a drive voltage applied to the light control sheet is in a range of 13 V or more and 100 V or less, the absolute value |ΔH| of a change in the value of haze is greater than the absolute value |ΔC| of a change in the value of clarity.

As shown in FIG. 6, the light control sheet having a polymer network type light control layer has a range in which the curve indicating haze and clarity has a steep gradient. In other words, the curve indicating haze and clarity has a range in which haze significantly changes and a range in which clarity significantly changes with a change in the magnitude of a voltage applied to the light control sheet. As described above, haze is a parameter for evaluating the state of the light control sheet using wide-angle scattered light, and clarity is a parameter for evaluating the state of the light control sheet using narrow-angle scattered light. Therefore, a light control sheet suitable for both the following two situations is obtained.

One is a situation in which only the degree of wide-angle scattering is required to be minutely increased from transparency. Specifically, for example, the situation is that in the light control sheet used for a vehicle window, brightness by outside light entering the vehicle interior is required, while a concealment target such as a posture or gesture of a human present in the vehicle is required to be visually unrecognizable from the outside. In such a situation, if the light control sheet has a steep gradient in the curve of haze and clarity, only the degree of wide-angle scattering can be finely changed in a range in which narrow-angle scattering having an angle within ±2.5° relative to the travelling direction of parallel light hardly exists.

The other is a situation in which only the degree of narrow-angle scattering is required to be minutely increased after wide-angle scattering has been saturated. Specifically, for example, the situation may be one in which the light control sheet is used for a vehicle window, outside light is not required to enter the vehicle interior, and a concealment target such as a valuable item positioned near the light control sheet is required to be visually unrecognizable from the outside. In such a situation, if the light control sheet has a steep gradient in the curve of haze and clarity, only the degree of wide-angle scattering can be finely changed in a range in which narrow-angle scattering having an angle greater than ±2.5° relative to the travelling direction of parallel light is mostly saturated. In this manner, a light control sheet having a steep gradient in the curve indicating haze and clarity can accommodate both the above-described situations. The above-described contents are not limited to a vehicle interior, and the same applies for a case in which the light control sheet is used for partitioning a meeting room, a house, or the like into two spaces.

As described above, the light control device and an embodiment of the light control sheet can achieve the advantageous effects provided below.

(1) The degree of scattering in the light control sheet 10A or 20A exhibiting the first characteristic is determined by a value of clarity. The degree of scattering in the light control sheet 10A or 20A exhibiting the second characteristic is determined by a value of haze. This can suppress the occurrence of discrepancies in recognition of an object through the light control sheet 10A or 20A, compared to a configuration in which the degree of scattering is determined by a single parameter such as haze.

(2) When the first characteristic is exhibited in the light control sheet 10A or 20A, a predetermined value of clarity that governs the degree of scattering in such a state is obtained. Also, when the second characteristic is exhibited in the light control sheet 10A or 20A, a predetermined value of haze that governs the degree of scattering in such a state is obtained. This can enhance the effectiveness of obtaining the effect of suppressing discrepancies similar to (1) described above.

(3) The drive circuit 10D switches a drive voltage applied to the light control sheet 10A or 20A, so that the state of the light control sheet 10A or 20A can be switched between the first state which is an opaque state and the second state which is a transparent state.

(4) Compared to when the unit voltage is more than 5 V, superiority in clarity in the first characteristic and superiority in haze in the second characteristic can be achieved even when a change in a voltage value applied to the light control sheet 10A or 20A is smaller. Therefore, compared to when the unit voltage is more than 5 V, the degree of scattering can be more minutely measured in the characteristics.

(5) In the light control device 10 or 20 including the light control sheet 10A or 20A having the light control layer 11 containing the liquid crystal molecules 11BL, the occurrence of discrepancies in recognition of an object through the light control sheet 10A or 20A can be suppressed.

The embodiment described above may be modified and implemented as follows.

<Drive Circuit>

When the drive circuit 10D causes the light control sheet 10A or 20A to exhibit the first characteristic, the drive circuit 10D may not apply a drive voltage corresponding to a predetermined value in clarity to the light control sheet 10A or 20A. In this case, the drive circuit 10D may apply a drive voltage corresponding to a predetermined value in haze, or may apply a drive voltage not corresponding to either of a predetermined value in clarity or a predetermined value in haze.

Also, when the drive circuit 10D causes the light control sheet 10A or 20A to exhibit the second characteristic, the drive circuit 10D may not apply a drive voltage corresponding to a predetermined value in haze to the light control sheet 10A or 20A. In this case, the drive circuit 10D may apply a drive voltage corresponding to a predetermined value in clarity, or may apply a drive voltage not corresponding to either of a predetermined value in haze or a predetermined value in clarity.

Even in these cases, the light control sheet 10A or 20A can have the first characteristic and the second characteristic which are selectively exhibited corresponding to the orientation of the liquid crystal molecules, so that, for example, the occurrence of discrepancies between the light control sheets, that is, discrepancies in recognition of an object through the light control sheet by an observer, can be suppressed during the production stage of the light control sheet 10A or 20A. Therefore, advantageous effects similar to (1) described above can be more than slightly achieved.

The drive circuit 10D may be switchable in the state of the light control sheet 10A or 20A among three or more states including the first state and the second state. In this case, the drive circuit 10D can be changed to a third state in which the value of clarity in the light control sheet 10A or 20A is in a range between the value in the first state and the value in the second state, and the value of haze is in a range between the value in the first state and the value in the second state. The drive circuit 10D can apply, to the light control sheet 10A or 20A, a drive voltage that is different from a drive voltage for setting the light control sheet 10A or 20A to the first stage and a drive voltage for setting to the second state, so that the state of the light control sheet 10A or 20A is set to the third state.

The light control sheet 10A or 20A can further include a controller that controls the driving of the light control sheet 10A or 20A in order to change the transmittance of the light control sheet 10A or 20A. In this case, the controller includes information, such as a table, for converting each different value of haze to drive voltage for causing the light control sheet 10A or 20A to exhibit the second characteristic. Thus, the controller causes the drive circuit to apply a drive voltage corresponding to the haze specified by an external operation device or the like. In addition, the controller includes information, such as a table, for converting each different value of clarity to a drive voltage for causing the light control sheet 10A or 20A to exhibit the first characteristic. Thus, the controller allows the drive circuit to apply a drive voltage corresponding to the clarity specified by an external operation device or the like. The light control sheet 10A or 20A including such a controller can enhance the effectiveness of achieving the effect of suppressing discrepancies.

<Light Control Sheet>

The unit voltage may be an optional value within a range of 5 V or more and 10 V or less. Even with any value within a range as a unit value, the light control sheet can achieve the effect similar to (1) described above, because it has the first characteristic and the second characteristic which are selectively exhibited corresponding to the orientation of the liquid crystal molecules.

The light control sheet 10A or 20A may have a planar shape, a curved shape having a curvature in the two-dimensional direction, or a curved shape having a curvature in the three-dimensional direction. The light control sheet 10A or 20A can include a transparent substrate 13 having flexibility. In this case, the light control sheet 10A or 20A also demonstrates excellent adaptation to curving of the light control sheet 10A or 20A.

<Light Control Layer>

The light control layer 11 is not limited to a polymer network liquid crystal. The light control layer 11 may be a polymer dispersed liquid crystal (PDCL) or a nematic curvilinear aligned phase (NCAP).

The light control layer 11 may contain a dichroic dye and show a predetermined color derived from the dichroic dye. Even in this case, the light control sheet 10A or 20A can achieve the effect similar to (1) described above, when it has the first characteristic and the second characteristic which are selectively exhibited corresponding to the orientation of the liquid crystal molecules.

The present application addresses the following. The value of haze of the light control sheet changes corresponding to a change in an applied voltage within a predetermined range, and exhibits substantially a constant value with respect to a change in an applied voltage outside the predetermined range. On the other hand, the degree of scattering in the light control sheet also varies with a change in an applied voltage outside the predetermined range. As a result, discrepancies in the degree of scattering and thus in recognition of an object through the light control sheet occur between light control sheets having the same value of haze as each other.

The present invention has an aspect to provide a light control device and a light control sheet which can suppress the occurrence of discrepancies in recognition of an object through the light control sheet.

A light control device includes a light control sheet and a drive circuit which applies a drive voltage to the light control sheet. The light control sheet includes a first characteristic and a second characteristic which are selectively exhibited. In the first characteristic, an absolute value of a change in a value of clarity per unit voltage is greater than an absolute value of a change in a value of haze per the unit voltage. In the second characteristic, an absolute value of a change in the value of haze per the unit voltage is equal to or greater than an absolute value of a change in the value of clarity per the unit voltage. The haze is calculated in accordance with JIS K 7136:2000. The clarity is calculated from the following Formula (1):

$$100\times(L_C-L_R)/(L_C+L_R) \quad \text{Formula (1)}$$

where $L_C$ is an intensity of straight light travelling straight along a travelling direction of parallel light that has entered the light control sheet, among light that has passed through the light control sheet, and $L_R$ is an intensity of narrow-angle scattered light having an angle within ±2.5° relative to the travelling direction of the parallel light.

A light control sheet includes a first characteristic and a second characteristic which are selectively exhibited. In the first characteristic, an absolute value of a change in a value of clarity per unit voltage is greater than an absolute value of a change in a value of haze per the unit voltage. In the second characteristic, an absolute value of a change in the value of haze per the unit voltage is equal to or greater than an absolute value of a change in the value of clarity per the unit voltage. The haze is calculated in accordance with JIS K 7136:2000. The clarity is calculated from the following Formula (1):

$$100\times(L_C-L_R)/(L_C+L_R) \quad \text{Formula (1)}$$

where $L_C$ is an intensity of straight light travelling straight along an optical axis of parallel light that has entered the light control sheet, among light that has passed through the light control sheet, and $L_R$ is an intensity of narrow-angle scattered light having an angle within ±2.5° relative to the optical axis of the parallel light.

According to the above-described configuration, the degree of scattering in the light control sheet exhibiting the first characteristic is determined by the value of clarity. The degree of scattering in the light control sheet exhibiting the second characteristic is determined by the value of haze. Therefore, compared to a configuration in which the degree of scattering is determined by a single parameter such as haze, discrepancies in recognition of an object through the light control sheet can be suppressed. For example, in the evaluation result of the transmittance of the light control sheet during production of the light control sheet, and in the result of driving the light control sheet such that the transmittance of the light control sheet changes in a stepwise manner, the occurrence of discrepancies between the light control sheets can be suppressed.

Obviously, numerous modifications and variations of the present invention are possible in light of the above teachings. It is therefore to be understood that within the scope of the appended claims, the invention may be practiced otherwise than as specifically described herein.

What is claimed is:

1. A light control device, comprising:
   a light control sheet; and
   a drive circuit configured to switch drive voltages to the light control sheet such that the light control sheet selectively exhibits a first characteristic set based on a degree of scattering in the light control sheet determined by a value of clarity and a second characteristic set based on the degree of scattering in the light control sheet determined by a value of haze where in the first characteristic, an absolute value of a change in clarity per unit voltage is greater than an absolute value of a change in haze per the unit voltage, and in the second characteristic, the absolute value of the change in the haze per the unit voltage is equal to or greater than the absolute value of the change in the clarity per the unit voltage,
   wherein the value of haze in the second characteristic is calculated in accordance with JIS K 7136:2000, and the value of clarity in the first characteristic is calculated by Formula (1), $100 \times (L_C - L_R)/(L_C + L_R)$ where $L_C$ is an intensity of straight light travelling straight along a travelling direction of parallel light that has entered the light control sheet, among light that has passed through the light control sheet, and $L_R$ is an intensity of narrow-angle scattered light having an angle within ±2.5° relative to the travelling direction of the parallel light.

2. The light control device according to claim 1, wherein the drive circuit is configured to apply a drive voltage corresponding to a predetermined value of clarity to the light control sheet such that the light control sheet exhibits the first characteristic, and the drive circuit is configured to apply a drive voltage corresponding to a predetermined value of haze to the light control sheet such that the light control sheet exhibits the second characteristic.

3. The light control device according to claim 1, wherein the drive circuit is configured to selectively apply a first drive voltage and a second drive voltage to the light control sheet such that when the drive circuit applies the first drive voltage to the light control sheet, the light control sheet exhibits the first characteristic and achieves a first state in which the haze that changes gradually converges to 98%-100%, and in which the light control sheet has the haze being converged and the clarity being 80% or less, and that when the drive circuit applies the second drive voltage to the light control sheet, the light control sheet exhibits the second characteristic and achieves a second state in which the clarity that changes gradually converges to 99%-100%, and in which the light control sheet has the clarity being converged and the haze being 15% or less.

4. The light control device according to claim 2, wherein the drive circuit is configured to selectively apply a first drive voltage and a second drive voltage to the light control sheet such that when the drive circuit applies the first drive voltage to the light control sheet, the light control sheet exhibits the first characteristic and achieves a first state in which the haze that changes gradually converges to 98%-100%, and in which the light control sheet has the haze being converged and the clarity being 80% or less, and that when the drive circuit applies the second drive voltage to the light control sheet, the light control sheet exhibits the second characteristic and achieves a second state in which the clarity that changes gradually converges to 99%-100%, and in which the light control sheet has the clarity being converged and the haze being 15% or less.

5. The light control device according to claim 1, wherein the unit voltage is 5 V or less.

6. The light control device according to claim 2, wherein the unit voltage is 5 V or less.

7. The light control device according to claim 3, wherein the unit voltage is 5 V or less.

8. The light control device according to claim 4, wherein the unit voltage is 5 V or less.

9. The light control device according to claim 1, wherein the light control sheet includes a pair of transparent electrode layers, and a light control layer formed between the pair of transparent electrode layers and comprising a plurality of liquid crystal molecules, and the light control sheet is configured to selectively exhibit the first characteristic and the second characteristic corresponding to an orientation of the liquid crystal molecules.

10. The light control device according to claim 2, wherein the light control sheet includes a pair of transparent electrode layers, and a light control layer formed between the pair of transparent electrode layers and comprising a plurality of liquid crystal molecules, and the light control sheet is configured to selectively exhibit the first characteristic and the second characteristic corresponding to an orientation of the liquid crystal molecules.

11. The light control device according to claim 3, wherein the light control sheet includes a pair of transparent electrode layers, and a light control layer formed between the pair of transparent electrode layers and comprising a plurality of liquid crystal molecules, and the light control sheet is configured to selectively exhibit the first characteristic and the second characteristic corresponding to an orientation of the liquid crystal molecules.

12. The light control device according to claim 8, wherein the light control sheet includes a pair of transparent electrode layers, and a light control layer formed between the pair of transparent electrode layers and comprising a plurality of liquid crystal molecules, and the light control sheet is configured to selectively exhibit the first characteristic and the second characteristic corresponding to an orientation of the liquid crystal molecules.

13. A light control sheet, comprising:
a pair of transparent electrode layers; and
a light control layer formed between the pair of transparent electrode layers and comprising a plurality of liquid crystal molecules such that the light control layer is configured to selectively exhibit a first characteristic set based on a degree of scattering in the light control sheet determined by a value of clarity and a second characteristic set based on the degree of scattering in the light control sheet determined by a value of haze,
wherein the pair of transparent electrode layers is configured to apply driving voltages to the light control layer such that in the first characteristic, an absolute value of a change in clarity per unit voltage is greater than an absolute value of a change in haze per the unit voltage and that in the second characteristic, the absolute value of the change in the haze per the unit voltage is equal to or greater than the absolute value of the change in the clarity per the unit voltage, the value of haze is calculated in accordance with JIS K 7136:2000, and the value of clarity is calculated by Formula (1), $100 \times (L_C - L_R)/(L_C + L_R)$ where $L_C$ is an intensity of straight light travelling straight along a travelling direction of parallel light that has entered the light control sheet, among light that has passed through the light control sheet, and $L_R$ is an intensity of narrow-angle scattered light having an angle within ±2.5° relative to the travelling direction of the parallel light.

14. The light control sheet according to claim 13, wherein the light control layer is configured to exhibit the first characteristic having a predetermined value of clarity corresponding to a first drive voltage, and the light control layer is configured to exhibits the second characteristic having a predetermined value of haze corresponding to a second drive voltage.

15. The light control sheet according to claim 13, wherein the light control layer is configured to exhibit the first characteristic and achieve a first state in which the haze that changes gradually converges to 98%-100%, and in which the light control layer has the haze being converged and the clarity being 80% or less, and to exhibit the second characteristic and achieves a second state in which the clarity that changes gradually converges to 99%-100%, and in which the light control layer has the clarity being converged and the haze being 15% or less.

16. The light control sheet according to claim 14, wherein the light control layer is configured to exhibit the first characteristic and achieve a first state in which the haze that changes gradually converges to 98%-100%, and in which the light control layer has the haze being converged and the clarity being 80% or less, and to exhibit the second characteristic and achieves a second state in which the clarity that changes gradually converges to 99%-100%, and in which the light control layer has the clarity being converged and the haze being 15% or less.

17. The light control sheet according to claim 13, wherein the unit voltage is 5 V or less.

18. The light control sheet according to claim 14, wherein the unit voltage is 5 V or less.

19. The light control sheet according to claim 15, wherein the unit voltage is 5 V or less.

20. The light control device according to claim 16, wherein the unit voltage is 5 V or less.

* * * * *